(No Model.)
T. C. MERZ.
GELATINE CIRCULATING DEVICE.
No. 489,539. Patented Jan. 10, 1893.
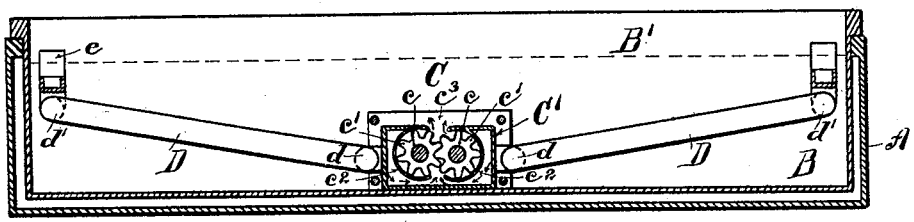
Fig. 1.
Fig. 2.
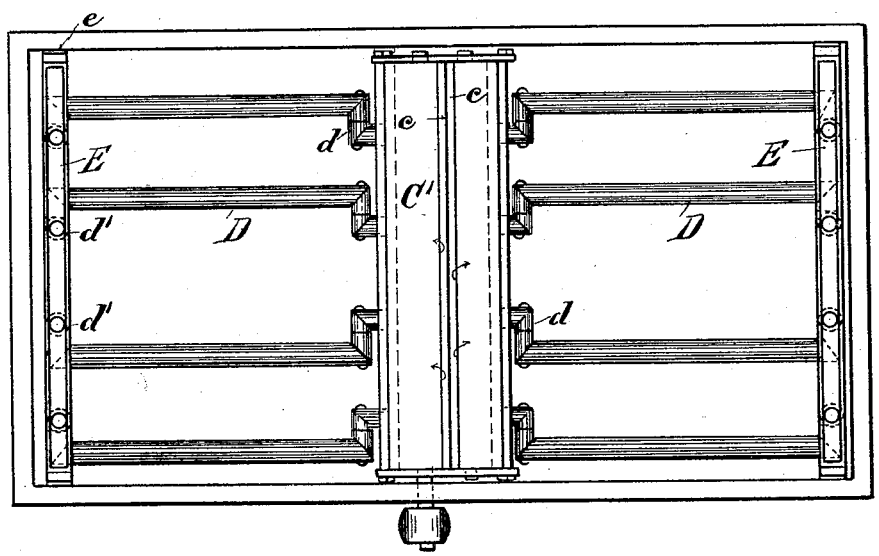
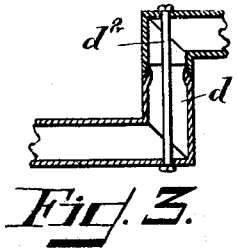
Fig. 3.
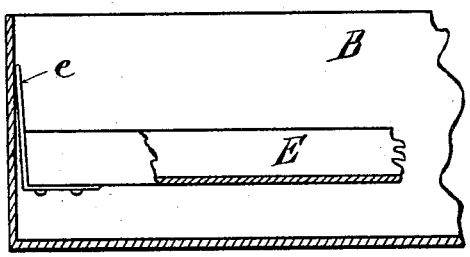
Fig. 4.
WITNESSES
F. Clough.
D. W. Bradford
INVENTOR
Theodore C. Merz
by Parker & Burton
Attorneys.
THE NORRIS PETERS CO., PHOTO-LITHO., WASHINGTON, D. C.

UNITED STATES PATENT OFFICE.

THEODORE C. MERZ, OF DETROIT, MICHIGAN.

GELATINE-CIRCULATING DEVICE.

SPECIFICATION forming part of Letters Patent No. 489,539, dated January 10, 1893.

Application filed April 20, 1892. Serial No. 429,879. (No model.)

*To all whom it may concern:*

Be it known that I, THEODORE C. MERZ, a citizen of the United States, residing at Detroit, county of Wayne, State of Michigan, have invented a certain new and useful Improvement in a Gelatine-Circulating Device; and I declare the following to be a full, clear, and exact description of the invention, such as will enable others skilled in the art to which it pertains to make and use the same, reference being had to the accompanying drawings, which form a part of this specification.

My invention relates to pans for holding and heating gelatine for manufacturing capsules, and its object is to provide means for circulating the gelatine to prevent its cooling and filming over the top.

In the drawings, Figure 1 is a vertical section. Fig. 2 is a plan view. Fig. 3 is a detail view, showing the manner of connecting the conducting pipes. Fig. 4 is a view showing the manner of supporting the troughs.

In the drawings, A is the outer pan; B, the inner or gelatine pan, the space between being preferably filled with water.

B' is a line indicating the surface of the gelatine in the pan B.

C is a rotary pump, consisting of the rollers $c\ c$, provided with the teeth $c'\ c'$. This pump is located in a suitable case C', and the walls of the pump $c^2$ are provided with an opening at the bottom for receiving the gelatine to be pumped, and with the discharge $c^3$ out through the case C', through which to deliver this gelatine. This pump is independent of the pans, and is placed in the center resting on the bottom of the gelatine pan.

E E are troughs extending across each end and within the gelatine pan B, and supported by means of the frictional contact of the springs $e$ against the sides of the pan. This manner of supporting the troughs permits us to move them up and down in the pan to keep them a suitable distance below the surface of the gelatine. I prefer to keep the troughs about three-eighths of an inch below the surface. Leading from these troughs E to the case C' of the pump are the pipes D. These pipes are preferably provided with a rotatable joint at $d$, near where they enter the case C', and at $d'$, near where they enter the troughs E. These joints are made rotatable by turning each section of the pipe at right angles with an elbow, and making one portion smaller than the other and adapted to telescope within it. By means of these rotatable joints in the pipes D, I am enabled to move the receiving troughs E up and down in the pan, and still conduct the gelatine through the pipes to the pump C. The joints are provided with the bolt $d^2$, to hold the parts in position.

The operation of the device is as follows: The pan is filled with gelatine to the line B', and the pump started, when its action will draw the gelatine through the pipes D from the troughs E at each end of the pan, and from the upper portion. This causes a movement of the gelatine on the upper surface toward the ends and into the troughs, while the pumps deliver the gelatine so drawn through the pipes E at the center, where it separates and moves in each direction toward the end. This makes a continuous circulation of the gelatine in the direction shown by the arrows. As the gelatine is used from the pan, it may be replaced by any suitable source of supply, arranged to keep the same amount of gelatine in the pan at all times; or if, for any reason, the amount is reduced in the pans, the troughs E may be forced down toward the bottom of the pan, and adapted to take the gelatine from a lower level; and I would have it understood that my device may be used with or without means for retaining a constant amount of gelatine in the pan.

Any suitable means may be employed for heating the gelatine, and as such means is well known, it need not be described or shown herein.

While I have described my device as adapted to be used for circulating gelatine for the manufacture of capsules, I do not desire to be limited to such use; but I would have it understood that it may be used in all circumstances where it is desirable to circulate liquids in a pan or other receptacle.

What I claim is—

1. In a device for stirring liquids, a pan, a pump in the bottom of said pan, troughs adjustably supported in said pan, and conduits leading from said troughs to said pump, substantially as described.

2. In a device for stirring liquids, a pan, a pump in the bottom of said pan, troughs adjustably supported in said pan, and conduits leading from said troughs to said pump, and having flexible connections therewith, substantially as described.

In testimony whereof I sign this specification in the presence of two witnesses.

THEODORE C. MERZ.

Witnesses:
C. H. FISK,
EFFIE I. CROFT.